(12) United States Patent
Baba et al.

(10) Patent No.: US 7,088,075 B2
(45) Date of Patent: Aug. 8, 2006

(54) BATTERY PACK

(75) Inventors: Makoto Baba, Kanagawa (JP);
Hidehisa Sugita, Fukushima (JP)

(73) Assignee: Sony Corporation, Tokyo (JP)

( * ) Notice: Subject to any disclaimer, the term of this patent is extended or adjusted under 35 U.S.C. 154(b) by 58 days.

(21) Appl. No.: 10/644,200

(22) Filed: Aug. 20, 2003

(65) Prior Publication Data
US 2004/0095093 A1 May 20, 2004

(30) Foreign Application Priority Data
Aug. 21, 2002 (JP) ............................ P2002-240590

(51) Int. Cl.
H02J 7/00 (2006.01)

(52) U.S. Cl. ...................................... 320/112; 320/114

(58) Field of Classification Search ................ 320/103, 320/134, 136, 112–114; 429/99, 100, 123
See application file for complete search history.

(56) References Cited

U.S. PATENT DOCUMENTS

| | | | |
|---|---|---|---|
| 4,659,636 A * | 4/1987 | Suzuki et al. .................. | 429/54 |
| 5,436,969 A * | 7/1995 | Kobayashi ............. | 379/433.09 |
| 5,534,364 A | 7/1996 | Watanabe et al. | |
| 5,534,366 A * | 7/1996 | Hwang et al. ................. | 429/91 |
| 5,631,101 A | 5/1997 | Amero et al. | |
| 5,818,198 A * | 10/1998 | Mito et al. ................... | 320/112 |
| 5,929,600 A * | 7/1999 | Hasegawa ................... | 320/112 |
| 6,387,567 B1 * | 5/2002 | Noh ........................... | 429/211 |
| 6,491,536 B1 * | 12/2002 | Torii ............................ | 439/246 |
| 6,492,058 B1 * | 12/2002 | Watanabe et al. ........... | 429/121 |

FOREIGN PATENT DOCUMENTS

| | | |
|---|---|---|
| EP | 0 926 6015 | 10/1997 |
| EP | 1 135 4089 | 12/1999 |
| GB | 2 341 989 | 3/2000 |
| JP | 7-201358 | 8/1995 |
| JP | 11-354089 | 12/1999 |
| WO | WO 00/79635 | 12/2000 |

* cited by examiner

Primary Examiner—Karl Easthom
Assistant Examiner—Robert Grant
(74) Attorney, Agent, or Firm—Bell, Boyd & Lloyd LLC

(57) ABSTRACT

A battery pack is provided. In the battery pack, batteries and a circuit are completely separated. A battery block includes a battery package that can house one or more of the batteries. The circuit block includes a measurement/protection circuit that has a measurement function about use conditions or performance of the batteries or a function to protect the batteries that is housed in a circuit package wherein the battery block and the circuit block are fit in and housed inside of an outer case. The battery block and the circuit block can be independently removed and replaced from the outer case. In this regard, where a defect of the battery block or the circuit block occurs in a manufacturing process, the block with the defect can be replaced on its own. When the batteries in the battery block are deteriorated or consumed, the battery block can be replaced on its own. An electrolytic solution leaked from the batteries remains in the battery package.

12 Claims, 6 Drawing Sheets

BATTERY PACK

CROSS REFERENCE TO RELATED APPLICATIONS

This patent application claims priority to Japanese Patent Document No. P2002-240590 filed on Aug. 21, 2002, the disclosure of which is herein incorporated by reference.

BACKGROUND OF THE INVENTION

The present invention generally relates to a battery pack. More specifically, the present invention relates to a battery pack with batteries and an associated circuit and the like housed in an outer case thereof, such as a battery pack which houses secondary batteries such as lithium ion batteries.

As a portable power source for portable electronic devices such as notebook computers, digital cameras, or video cameras, a chargeable battery pack is used. As electronic devices have become highly efficient, downsized, and portable, research and development to enable the battery pack to operate for a long time is actively promoted. For example, a battery pack using lithium ion secondary batteries are of much interest, since it provides a larger energy density compared to conventional battery packs which use lead batteries or nickel-cadmium batteries, and it has little memory effect.

However, the lithium ion secondary battery is in danger of being destroyed due to overcharge and over discharge. Additionally, charge and discharge varies with respect to the individual battery. Therefore, particularly in the battery pack using a plurality of lithium ion secondary batteries, a circuit to uniform charge conditions by controlling charge and discharge for every individual battery, or a circuit to prevent over discharge and overcharge is connected in many cases. Such circuit is directly welded or soldered to the batteries by tabs made of, for example, nickel (Ni).

However, in the conventional battery pack wherein its batteries and its circuit are directly welded or soldered, when the lithium ion secondary batteries are destroyed due to over discharge or overcharge, there is the danger that an electrolytic solution made of an organic solvent leaks and contacts electronic parts of the circuit, leading to a major accident such as smoking and ignition due to migration. Additionally, there is a problem such that when a defect of the battery or the circuit individually occurs after assembly, a whole set of the batteries and the circuit is disposed, resulting in reduced manufacturing yield ratio and increased waste.

The batteries are generally consumed earlier than the circuit in the battery pack in many cases. However, when trying to replace only the battery after it is consumed, in reality, it is impossible to remove the tab from the consumed battery and mount a new battery since the battery and the tab are spot-welded. Therefore, when the battery is consumed, a whole set of the batteries, tabs, and the circuit has to be disposed in spite of no deterioration in the circuit. This causes a problem in terms of environmental aspect, resource conservation, or effective use of resources as well.

SUMMARY OF THE INVENTION

It is an advantage of the present invention to provide a battery pack which can completely separate batteries and a circuit.

It is another advantage of the present invention to provide a battery pack which can prevent an increase of needless waste and utilize resources effectively.

A battery pack according to an embodiment of the present invention includes a battery block housing batteries in a battery package; a circuit block housing a circuit having a measurement function about use conditions or performance of the batteries, or a protective function to protect the batteries in a circuit package; and an outer case capable of fitting in and housing the battery block and the circuit block wherein the battery block and the circuit block can be independently desorbed from the outer case.

In a battery pack according to another embodiment of the present invention, batteries and a circuit having a measurement function about use conditions or performance of the batteries or a protection function to protect the batteries are housed in an outer case. In the battery pack, inside of the outer case is completely separated into two chambers by a partition wall, and the batteries and the circuit are individually housed in the two chambers respectively.

In the battery pack according to an embodiment of the present invention, the outer case can fit in and house the battery block and the circuit block. In this regard, the battery block and the circuit block are tightly fit inside of the outer case, namely, as a nested structure, so that there is no shaky movement, that is, minimal or effectively no vibration. Additionally, since the battery block and the circuit block can be independently desorbed from the outer case, when a defect of the battery block or the circuit block occurs in a manufacturing process, the block with the defect can be picked up and replaced. Since the batteries and the circuit are separately housed in the battery package and the circuit package respectively, even though an electrolytic solution leaks from the batteries, the leaked electrolytic solution remains in the battery package. The number of the batteries housed in the battery block may be one or more.

In the battery pack according to an embodiment of the present invention, inside of the outer case is completely separated into two chambers by the partition wall, and the batteries and the circuit are housed separately in the two chambers respectively. Thus, even when an electrolytic solution leaks from the batteries, the leaked electrolytic solution remains in the chamber which houses the batteries. The number of the housed batteries may be one or more.

Additional features and advantages of the present invention are described in, and will be apparent from, the following Detailed Description of the Invention and the figures.

BRIEF DESCRIPTION OF THE FIGURES

FIG. 5A is a top view; and FIG. 5B is a side view.

DETAILED DESCRIPTION OF THE INVENTION

The present invention generally relates to battery packs. In particular, the present invention relates to battery packs that have one or more batteries and associated circuit housed in an outer pack thereof.

The present invention will be described in detail below with reference to the drawings without limitation to the scope of the present invention.

Figure 1:
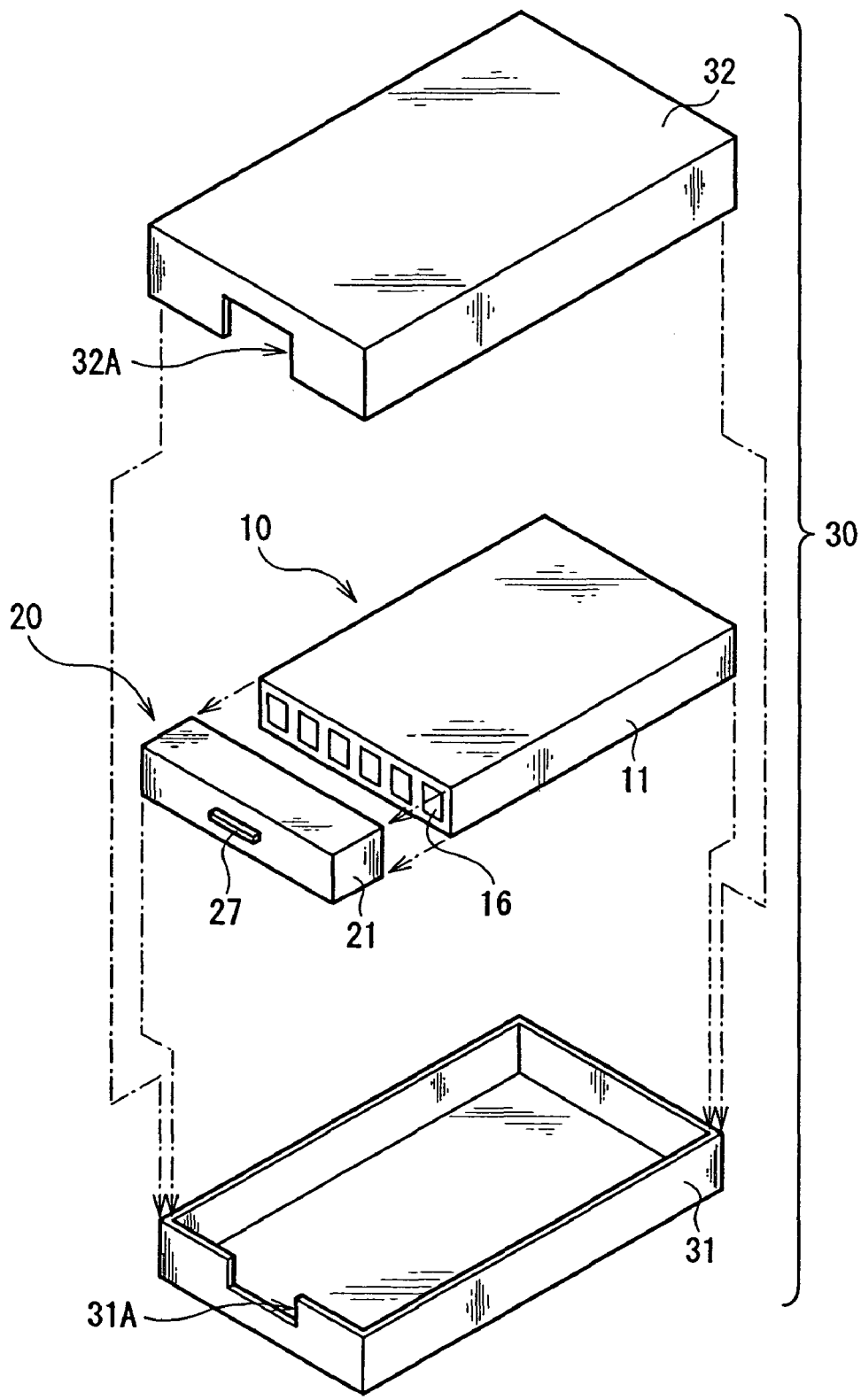
FIG. 1 is perspective figure showing an outline construction of a battery pack according to an embodiment of the present invention.

FIG. 1 shows an outline construction of a battery pack according to embodiment of the present invention. The battery pack is used, for example, as a portable power source for a notebook computer. In the battery pack, a battery block 10 and a circuit block 20 are housed inside of an outer case 30.

The battery block 10 includes a battery package 11 made by, for example, injection-molding a styrol resin. Though not shown in FIG. 1, secondary batteries (cells) which can be charged and discharged, such as lithium ion secondary batteries, are sealed and housed inside of this battery package 11.

The circuit block 20 includes a circuit package 21 made by, for example, injection-molding a styrol resin. Though not shown in FIG. 1, a measurement/protection circuit having a measurement function about use conditions or performance of the batteries or a function to protect the batteries is housed inside of this circuit package 21. Though the circuit package 21 is preferably sealed completely, practices are not limited to this manner. For example, when the battery package 11 is sealed, the circuit package 21 can be provided with a small hole to relieve an increased pressure due to heat generated by the circuit. This small hole is preferably, for example, provided on the opposite side of the circuit block 20 so that the circuit block 20 is hard to receive adverse effects in case of leakage of an electrolytic solution of the battery in the battery package 11. In this case as well, however, the side of the circuit package 21 facing the battery block 10 is preferably sealed with no small hole provided, in order to prevent the electrolytic solution from leaking through the small hole and intruding in the circuit block 20.

As above, the batteries and the measurement/protection circuit are separately housed in the battery package 11 and the circuit package 21 respectively. In addition, at least the battery package 11 is sealed. Thus, in case where the electrolytic solution leaks from the batteries, the leaked electrolytic solution remains inside of the battery package 21, and is hard to reach the measurement/protection circuit in the circuit package 21. Further, the battery package 11 and the circuit package 21 block transmission of the heat generated by the batteries in the battery block 10 during high load discharge to the circuit block 20. They also block transmission of the heat generated in the measurement/protection circuit in the circuit block 20 to the battery block 10. Thus, deterioration or unbalance of the battery performance influenced by the heat can be prevented.

The outer case 30 is made, for example, by injection-molding a styrol resin. For example, it is colored with the same color as the color for a notebook computer body (not shown). The outer case 30 is constructed by combining an open top lower case 31 and an upper case 32 which is shrouded by the lower case 31 in such a way that each side face overlaps each other. On the side face of the lower case 31, a notch 31A is provided in order to lead an external connector 27 of the circuit block 20 described later. On the side face of the upper case 32, a notch 32A is provided corresponding to the notch 31 A of the lower case 31. The shapes of the notch 31A and the notch 32A are set so that a through-hole can be formed to lead the external connector 27 when the lower case 31 is shrouded by the upper case 32.

Further, the outer case 30 can fit in and house the battery block 10 and the circuit block 20. Thus, the battery block 10 and the circuit block 20 are tightly fit inside of the outer case 30, what they call, as nested structure, so that there is no shaky movement, that is, minimal or effectively no vibration. In order to obtain this condition, for example, an inside dimension of the lower case 31 of the outer case 30 can be set to the same size as the total of outside dimensions of the battery block 10 and the circuit block 20, and to push and house the battery block 10 and the circuit block 20 in the lower case 31. Though an illustration is omitted, the inside dimension of the lower case 31 can be stet, in an embodiment, to a little larger size than the total of the outside dimensions of the battery block 10 and the circuit block 20, to provide a boss or a raised ridge inside of the lower case 31 to support the battery block 10 and the circuit block 20, so that the battery block 10 and the circuit block 20 can be easily pushed in by inserting fingers in a clearance around the boss or the raised ridge. Further, the impact can be softened by providing an appropriate buffer material between the lower case 31 and the battery block 10 or the circuit block 20. Furthermore, a partition can be provided at the boundary between the battery block 10 and the circuit block 20 on the side face or the bottom face of the lower case 31, in order to ease the positioning.

Additionally, the battery block 10 and the circuit block 20 can be independently desorbed from the outer case 30. Namely, it is possible to remove and replace the battery block 10 only, or the circuit block 20 only. Thus, when a defect of the battery block 10 or the circuit block 20 occurs in a manufacturing process, the block with the defect only can be picked up and replaced. In the case where the batteries in the battery block 10 are deteriorated or consumed, and the circuit block 20 is well-functioned, a user can purchase a new battery block 10 and replace the old battery block with the new one, and can continue to use the circuit block 20.

In order to ease such replacement work, it is preferable that the outer case 30 can be opened and shut, and the lower case 31 and the upper case 32 are not easy to depart during usage or transportation. For example, the outer case 30 can be closed by providing an unshown claw on the side face of the upper case 32 and providing an unshown notch on the side face of the lower case 31, and locking the claw of the upper case 32 and the notch of the lower case 31 together. Further, the inside dimension of the upper case 32 can be set to the same size as the outer size of the lower case 31, the upper case 32 and the lower case 31 are closed by pushing the lower case 31 into the upper case 32, and when opening them, the both cases are pulled in the opposite direction to remove the upper case 32. However, in order to prevent the outer case 30 from separating due to unconsidered decomposition during transportation, mischief by children and the like, the lower case 31 and the upper case 32 can be contacted with an adhesive. In this case, it is not possible to continue to use the outer case 30 while replacing the battery block 10. However, the lower case 31 and the upper case 32 can be broken open, and reuse the circuit block 20 for a new battery pack, when collecting the battery pack housing the used battery block 10.

Figure 2:
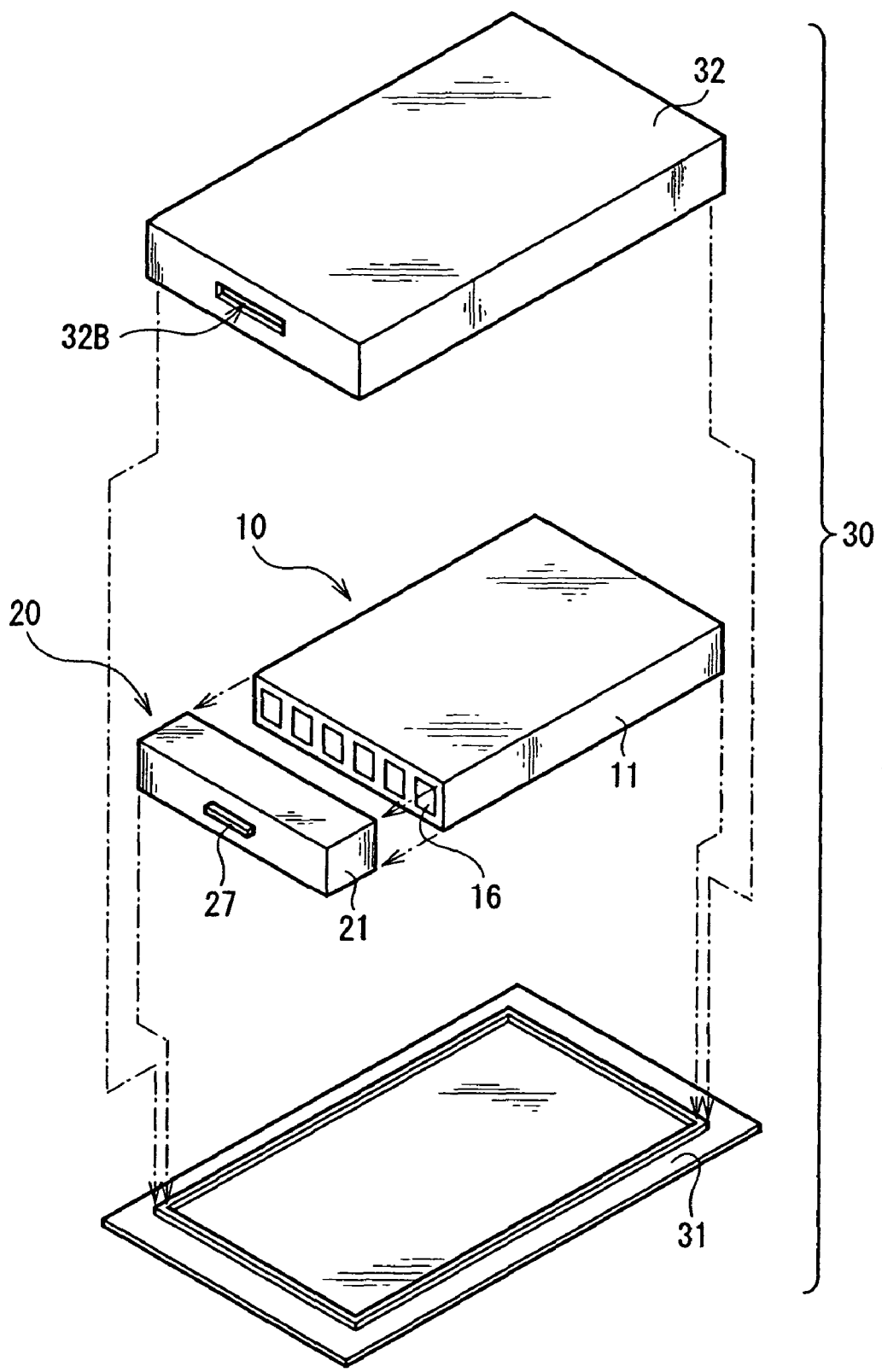
FIG. 2 is a perspective figure showing a modified example of an outer case illustrated in FIG. 1 according to an embodiment of the present invention.

The shapes of the lower case 31 and the upper case 32 are not limited to the shapes whose side faces are overlapped each other as shown in FIG. 1. For example, as shown in FIG. 2, the shape of the lower case 31 can include an approximately flat plate, and the lower case 31 is shrouded by the upper case 32. In this case, the upper case 32 may be provided with a through-hole 32B whose shape corresponds to the external connector 27, instead of the notch 32A. On the other hand, though not shown in the figure, the shape of the upper case 32 can include to an approximately flat plate, the lower case 31 is set to an open top box, and the opening of the lower case 31 is closed by using the upper case 32 as a cover. In this case, the lower case 31 may be provided with a through-hole whose shape corresponds to the external connector 27, instead of the notch 31A.

Figure 3:
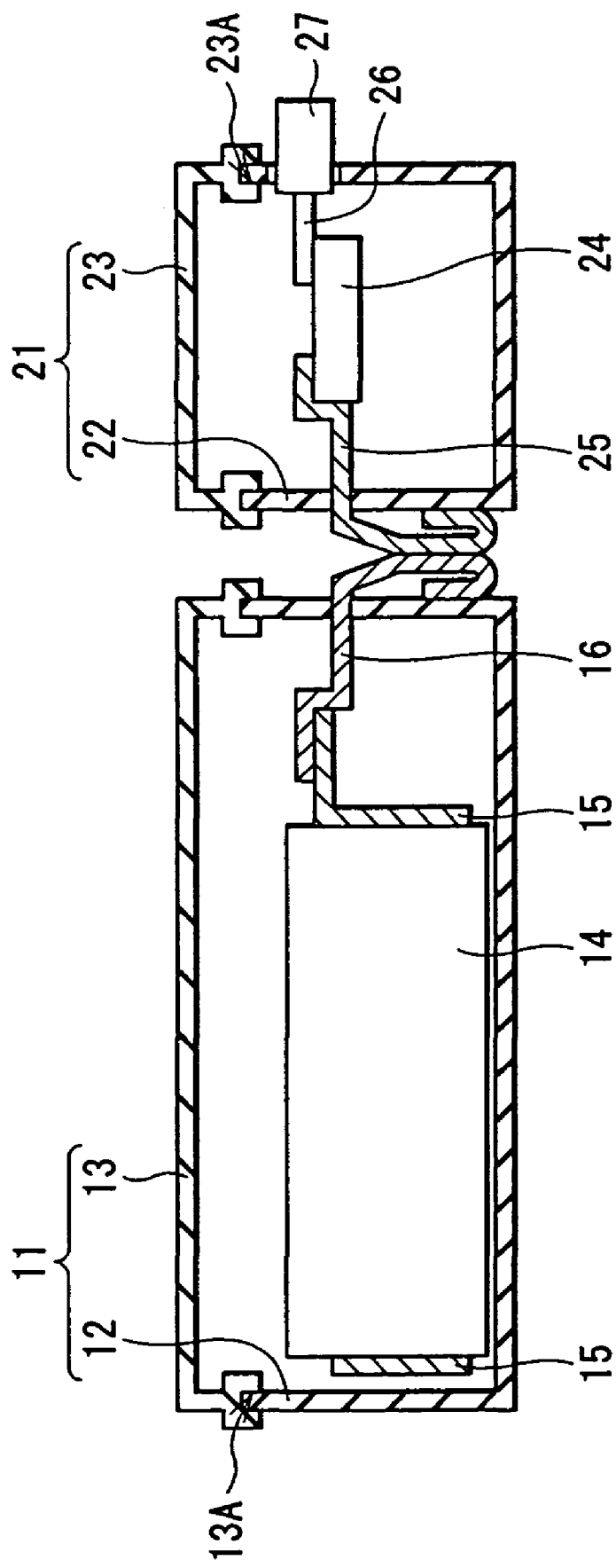
FIG. 3 is a cross sectional view showing an example of an internal construction of a battery block and a circuit block illustrated in FIG. 1 according to an embodiment of the present invention.

FIG. 3 shows an example of an internal construction of the battery block 10 and the circuit block 20. The battery package 11 includes a lower package 12 in an approximately box shape with an open top, and an upper package 13 having a seal structure by being fit into the opening of the lower package 12. The circuit package 21 includes an open top lower package 22 and an upper package 23 having a seal structure by being fit into the opening of the lower package 22. The battery package 11 and the circuit package 21 are preferably hermetic packages. The reason for it is that leakage or intrusion of the electrolytic solution can be further surely prevented, and separation of the packages 11 and 21 due to unconsidered decomposition during transportation, mischief by children or the like can be prevented. For example, at the edges of the upper packages 13 and 23, grooves 13A and 23A corresponding to the openings of the lower packages 12 and 22 are provided. Hermetic structure is made by fitting the lower packages 12 and 22 into these grooves 13 A and 23A with press fitting. In the press fitting, the lower packages 12 and 22 can be adhered by applying an adhesive to the grooves 13A and 23A of the upper packages 13 and 23, or by using press application. It should be appreciated that the hermetic structures of the battery package 11 and the circuit package 21 are not limited to the example shown in FIG. 3.

In the lower package 12 of the battery package 11, batteries 14 are housed. The batteries 14 are arranged based on a given polarity, and connected with each other by tabs 15. The tab 15 is connected to connection terminals 16 for connection with the circuit block 20. This connection is described later. The number of the batteries 14 is set so that capacity and output voltage suitable for the electric energy consumed and voltage of the notebook computer which uses this battery pack can be obtained. Thus, the number of them may be one or more.

The battery 14 is, for example, a cylindrical lithium ion secondary battery, which houses a wound electrode body wherein a strip-shaped cathode and a strip-shaped anode are wound several times, sandwiching a separator in which an electrolytic solution is impregnated in an approximately hollow cylindrical battery can. For each component for the battery 14, known materials can be used. For example, the battery can be made of iron plated by nickel. The cathode can be include of a mixture layer made of a lithium composite oxide of the active material, a conductive material such as graphite, and a binder resin such as poly vinyliden fluoride; and a current collector layer such as aluminum (Al) foil. The anode can include a mixture layer made of carbon powders such as graphite and a binder resin such as poly vinyliden fluoride; and a current collector layer such as copper (Cu) foil. As the electrolytic solution, for example, the electrolytic solution made by dissolving lithium salt such as $LiPF_6$ in a non-soluble solvent such as ethylene carbonate is used. As a separator, for example, a porous film whose principal ingredient is a polyolefin material such as polypropylene is used.

The tabs 15 are, for example, made by punching out the plate material made of a metal such as nickel into a strip shape, and bending the punched strips in a given shape.

The connection terminals 16 are arranged on the side of the battery package 11 facing the circuit block 20. The connection terminal 16 includes a power source terminal connected with the cathode and the anode of the battery 14, a signal input/output terminal connected with an unshown temperature sensor to detect temperatures of the battery 14 and the like. It should be appreciated that the number of the connection terminals 16 may be the number required to make connection between the batteries 14 and a measurement/protection circuit 24 described later. The part of the connection terminal 16, which is exposed out of the battery package 11 is, for example, a blade spring in an approximate square shape. The part of the connection terminal 16 inside of the battery package 11 is, for example, in a tranche shape, where connection is made with the tab 15. It is preferable that the connection terminal 16 is arranged on the lower package 12 of the battery package 11 by insert molding, since leakage of the electrolytic solution through a clearance between the lower package 12 and the connection terminal 16 can be prevented.

The measurement/protection circuit 24 is housed in the lower package 22 of the circuit package 21. The measurement/protection circuit 24 is connected to connection terminals 25 for connection with the battery block 10. The measurement/protection circuit 24 is connected to the external connector 27 for connection with the notebook computer body not shown in the figure, through the intermediary of a flexible wiring plate 26.

The measurement/protection circuit 24 has a function to determine lowering of the storage capability when electric resistance of the batteries 14 is detected and the value of the electric resistance becomes a given value or more; a function to raise an alarm when the temperature of the batteries 14 is detected and the value of the temperature becomes a given value or more; a function to protect the batteries 14 by preventing over discharge and overcharge of the batteries 14, and the like.

The connection terminals 25 are arranged on the side of the circuit package 21 facing the battery block 10. Each connection terminal 25 corresponds to each connection terminal 16 of the battery block 10. The part of the connection terminal 25, which is exposed out of the circuit package 21 is, for example, a blade spring in an approximate square shape. The part of the connection terminal 25 inside of the circuit package 21 is, for example, in a tranche shape, whose edge is connected to an unshown pad provided on the measurement/protection circuit 24 by, for example, soldering. It is preferable that the connection terminal 25 is arranged on the lower package 22 of the circuit package 21 by insert molding, since intrusion of the electrolytic solution through the clearance between the lower package 22 of the circuit package 21 and the connection terminal 25 into the circuit block 20 can be prevented.

The external connector 27 includes terminals, commencing with an output terminal, in order to input or output various information about conditions of the batteries 14. As various information about conditions of the batteries 14, for example, there are an output signal from a thermistor provided on the surface of the battery 14, a signal to measure the internal resistance of the battery 14 or the like. The external connector 27 is not limited to a connector, but may be what they call a terminal in a general bossy shape.

The connection terminals 16 and 25 are not limited to the constitution shown in FIG. 3. For example, the part of the connection terminal 16 which is exposed out of the battery package 11 is a blade spring, a boss part with smooth surface is provided on the part of the connection terminal 25 which is exposed out of the circuit package 21, and connection is surely made by pressing the connection terminals 16 and 25 each other. In this case, a helical spring can be mounted to provide the boss part of the connection terminal 25 with an additional momentum toward the outside of the circuit package 21, and to further strengthen pressing force of the connection terminals 16 and 25.

Figure 4:
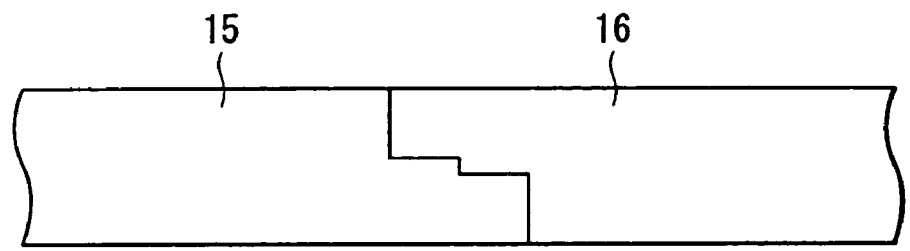
FIG. 4 is a top view showing a condition after a connection terminal and a tab illustrated in FIG. 3 are connected according to an embodiment of the present invention.
Figure 5A:
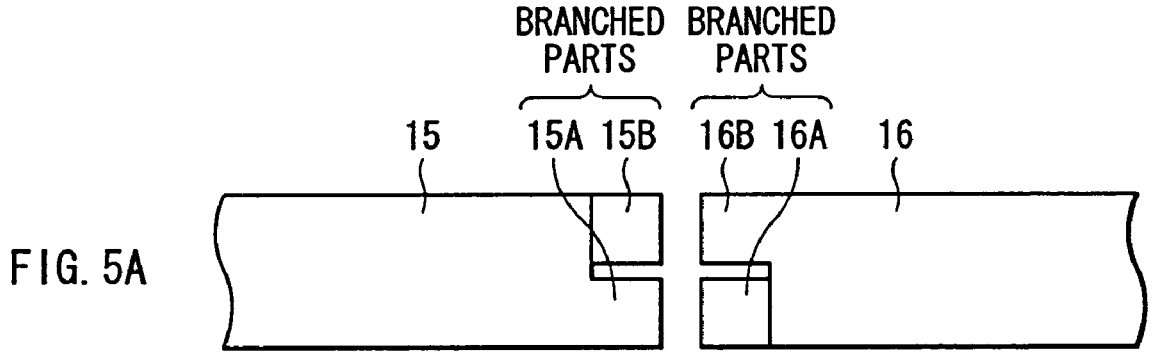
FIGS. 5A and 5B are views showing a condition before the connection terminal and the tab illustrated in FIG. 4 are connected according to an embodiment of the present invention.
Figure 5B:
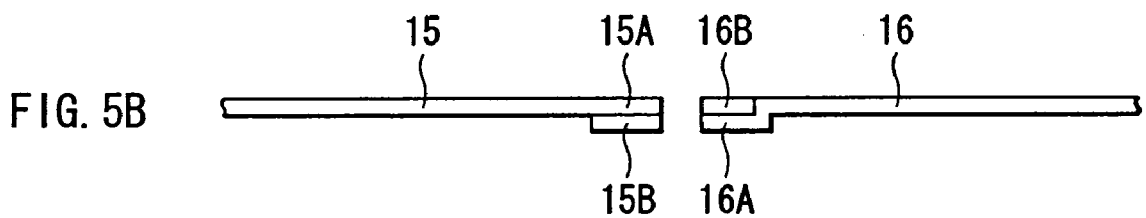

FIG. 4 shows a condition after the connection terminal 16 is connected to the tab 15. FIG. 5A shows an overhead view of the connection terminal 16 and the tab 15 before their connection, and FIG. 5B shows a side view of the connection terminal 16 and the tab 15 before their connection, respectively. As shown in FIGS. 5A and 5B, the connection terminal 16 has branched parts 16A and 16B on the edge. The tab 15 also has branched parts 15A and 15B on the edge. As shown in FIG. 4, the connection terminal 16 and the tab 15 are connected by engaging the branched parts 16A and 16B of the connection terminal 16 and the branched parts 15A and 15B of the tab 15, and by soldering or welding the joint surface of the both. Thus, joint strength between the tab 15 and the connection terminal 16 can be improved.

In an embodiment, a tab similar to the tab 15 of the battery block 10 can also be provided between the connection terminal 25 and the measurement/protection circuit 24, one end of this tab is soldered on the pad of the measurement/protection circuit 24, and the other end of the tab and the connection terminal 25 are connected in the same manner as in the connection of the tab 15 and the connection terminal 16 shown in FIG. 4.

In this battery pack, the battery block 10 and the circuit block 20 are fit into the lower case 31 of the outer case 30, and the outer case 30 is closed by shrouding the lower case 31 by the upper case 32. In the case where a defect of the battery block 10 or the circuit block 20 occurs in a manufacturing process, the block with the defect is only picked up and replaced. In the case where the batteries of the battery block 10 are deteriorated or consumed, only the battery block 10 is replaced, and the circuit block 20 is continued to be used if usable. Additionally, when the electrolytic solution of the batteries 14 is leaked, the leaked electrolytic solution remains inside of the battery package 11 since the battery package 11 has a hermetic structure.

As discussed above, in an embodiment, the outer case 30 can fit in and house the battery block 10 and the circuit block 20. Thus, the battery block 10 and the circuit block 20 are tightly fit inside of the outer case 30, what they call, as nested structure, so that there is no shaky movement. Additionally, since the battery block 10 and the circuit block 20 can be independently desorbed from the outer case 30, when a defect of the battery block 10 or the circuit block 20 occurs in a manufacturing process, it is possible to only pick up and replace the block with the defect. Therefore, manufacturing yield ratio can be improved, and amount of waste can be decreased, resulting in obtaining a great advantage environmentally. Further, since when the batteries 14 of the battery block 10 are deteriorated or consumed due to duration of life or the like, it is possible to replace only the battery block 10 and continue to use the well-functioning circuit block 20. Therefore, needless waste can be avoided.

In addition, the batteries 14 and the measurement/protection circuit 24 are separately housed in the battery package 11 and the circuit package 21 respectively. Thus, even when the electrolytic solution leaks from the batteries 14, the leaked electrolytic solution remains in the battery package 21, and is hard to reach the measurement/protection circuit 24 in the circuit package 31. Therefore, major accidents such as smoking and ignition due to migration are prevented, and the safety is improved. Further, the battery package 11 and the circuit package 21 block transmission of the heat generated by the batteries 14 in the battery block 10 during high load discharge to the circuit block 20. They also block transmission of the heat generated in the measurement/protection circuit 24 in the circuit block 20 to the battery block 10. Thus, deterioration or unbalance of the battery performance influenced by the heat can be prevented.

Particularly, since the battery package 11 and the circuit package 21 are hermetic packages, leakage and intrusion of the electrolytic solution are further surely prevented.

Figure 6:
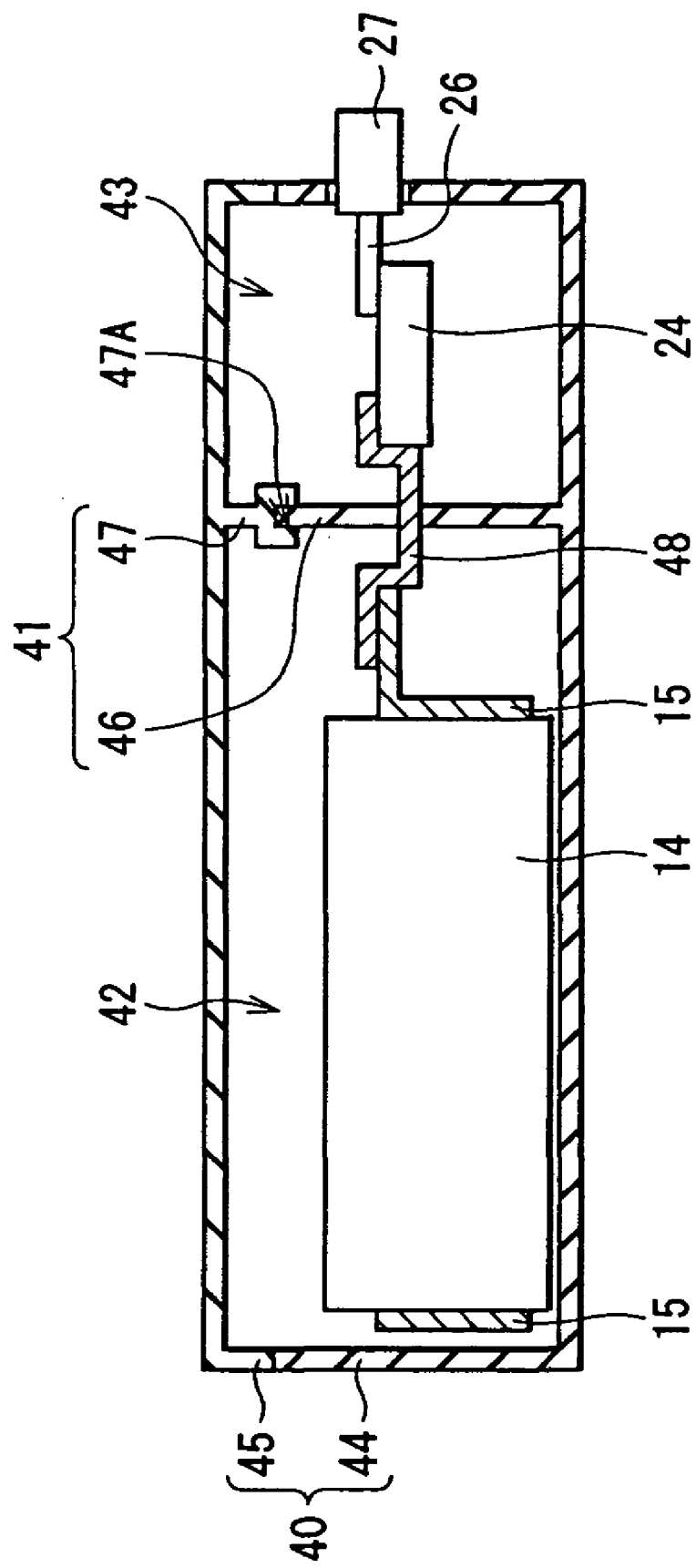
FIG. 6 is a cross sectional view showing an outline construction of a battery pack according to an embodiment of the present invention.

FIG. 6 shows a cross sectional structure of a battery pack according to another embodiment of the invention. This is the same battery pack as the battery pack described above, except that inside of an outer case 40 is completely separated in two chambers of a battery chamber 42 and a circuit chamber 43 by a partition wall 41, and the batteries 14 and the measurement/protection circuit 24 are separately housed in the battery chamber 42 and the circuit chamber 43 respectively. Therefore, the same symbols are applied to the same components, and detailed descriptions about those components are omitted.

The outer case 40 is made, for example, by injection-molding a styrol resin. Its main part comprises an open top lower case 44 and an upper case 45 having a hermetic structure by being joined on the opening of the lower case 44. Inside of the lower case 44 is sectioned into the battery chamber 42 and the circuit chamber 43 by a lower partition wall 46. The battery chamber 42 houses the batteries 14, and the circuit chamber 43 houses the measurement/protection circuit 24. The batteries 14 in the battery chamber 42 are connected with each other by the tab 15.

The upper case 45 has an upper partition wall 47 in the position facing the lower partition wall 46 of the lower case 44. The upper partition wall 47 has a groove 47A corresponding to the lower partition wall 46. Hermetic structures of the battery chamber 42 and the circuit chamber 43 are made by forming the partition wall 41 by press fitting the lower partition wall 46 into this groove 47A, and by joining the upper case 45 to the opening of the lower case 44. Though there is a conventional partition wall in the outer case, which is, for example, the partition wall made by ultrasonic-joining an upper partition wall and a lower partition wall. In this case, however, a battery chamber and a circuit chamber cannot be completely separated due to fluctuation of attachment conditions and a director structure. In the case where a fixed partition wall is provided in the outer case, complete separation is also impossible. In this case, intrusion of the electrolytic solution from the joint surface of the outer case and the fixed partition wall into the circuit chamber cannot be avoided. In an embodiment, by forming the partition wall 41 by press fitting the lower partition wall 46 into the groove 47A of the upper partition wall 47, the battery chamber 42 and the circuit 43 are completely separated, the electrolytic solution leaked from the batteries 14 remains in the battery chamber 42, and intrusion of the leaked electrolytic solution into the circuit chamber 43 can be surely prevented. It is noted that the structural strength of the outer case 40 by the partition wall 41. In press fitting the lower partition wall 46 can form a tight joint by applying an adhesive to the groove 47A of the upper partition wall 47, or by using press application.

Figure 7:
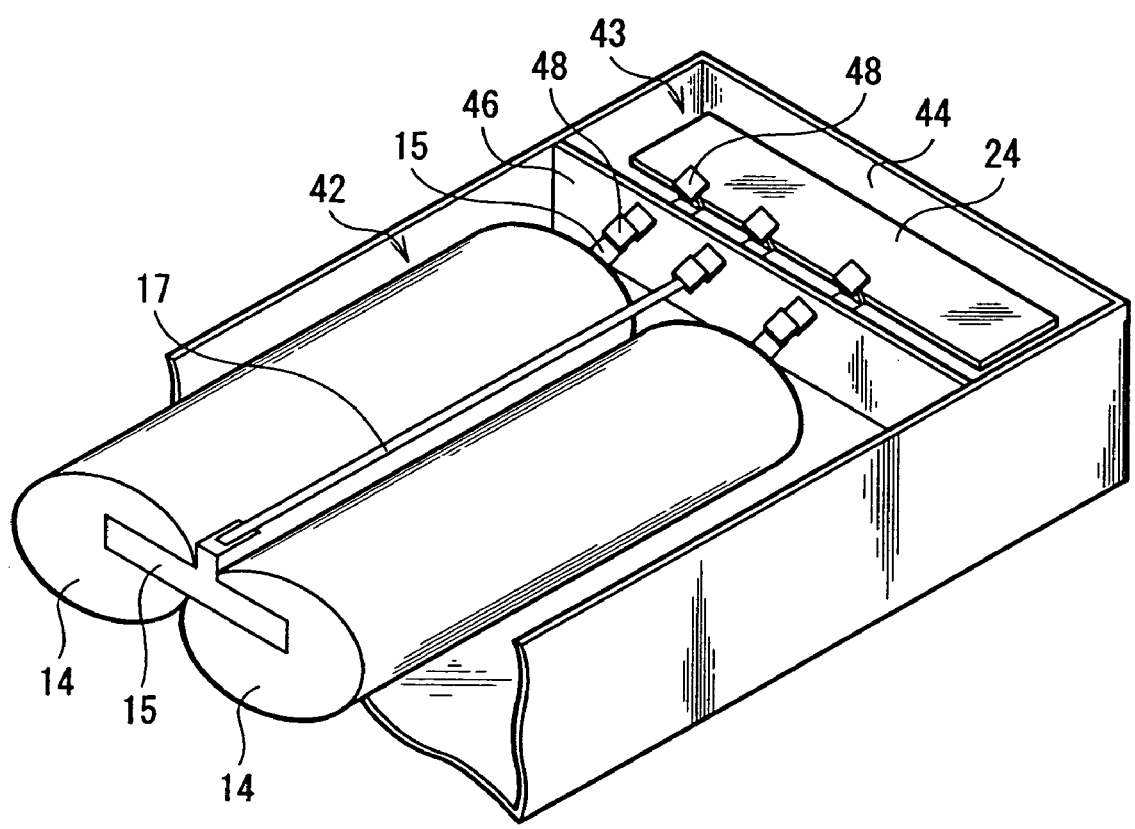
FIG. 7 is perspective figure showing a condition wherein an upper case of the battery pack shown in FIG. 6 is removed according to an embodiment of the present invention.

FIG. 7 shows a condition where the upper case 45 of the outer case 40 is removed. Tabs 48 which electrically connect the batteries 14 and the measurement/protection circuit 24 are provided through the lower partition wall 46 of the lower case 44. In an embodiment, the three tabs 48 are arranged. The tabs 48 at both ends are connected to the cathode and the anode of the batteries 14 respectively, and the central tab 48 is connected to a midpoint lead 17. The midpoint lead 17 is, for example, provided in order to measure a potential between the two batteries 14. It is preferable that the tabs 48 are arranged on the lower partition wall 46 by insert molding, since intrusion of the electrolytic solution through the clearance between the lower partition wall 46 and the tabs 48 into the circuit chamber 43 can be prevented. The tabs 48 can be provided on the upper partition wall 47. However, it is preferable to provide them on the lower partition wall 46, since connection between the tabs 48 and the tab 15 of the batteries 14 and connection between the tabs 48 and the measurement/protection circuit 24 can be easily performed.

In order to improve the joint strength, the tab 15 of the batteries 14 can be connected to the tab 48 of the outer case 40 in the same manner as in the connection of the tab 15 of the battery 14 and the connection terminal 16 described with reference to FIGS. 4, 5A and 5B in the first embodiment. Namely, both can be connected by forming branched parts 48A and 48B at the edge of the tab 48 of the outer case 40, engaging the branched parts 48A and 48B of the tab 48 of the outer case 40 and the branched parts 15A and 15B of the tab 15 of the battery 14, and soldering or welding the joint surface.

As discussed above, according to an embodiment, inside of the outer case 40 is completely separated in two chambers, the battery chamber 42 and the circuit chamber 43 by the partition wall 41; and the batteries 14 and the measurement/protection circuit 24 are separately housed in the battery chamber 42 and the circuit chamber 43 respectively. Thus, in the case where the electrolytic solution leaks from the batteries 14, the leaked electrolytic solution remains in the battery chamber 42, and is hard to reach the measurement/protection circuit 24 in the circuit chamber 43. In result, major accidents such as smoking and ignition due to migration are prevented, and the safety is improved. Further, structural strength of the outer case 40 can be improved by providing the partition wall 41 in the outer case 40.

Though the invention has been described by the embodiments, the invention is not limited to the embodiments but can be modified. For example, though the example of the battery pack for the notebook computer has been described in the foregoing embodiments, the invention can be also similarly applied to a battery pack for other portable electronic devices such as digital cameras, video cameras, mobile phones and the like.

Further, though the case of setting both the battery package 11 and the circuit package 21 to the hermetic packages and the case of hermetically sealing the battery package 11 and providing a small hole on the circuit package 21 have been described in the foregoing first embodiment, the circuit package 21 can include a completely hermetic package, and a small hole is provided on the battery package 11 in order to relieve the pressure increased due to heat generated by the batteries 14. This small hole is preferably provided, for example, on the opposite side of the circuit block 20, so that the circuit block 20 or the connection terminals 16 and 25 hardly have adverse effects in case of the electrolytic solution leakage of the batteries 14. However, also in this case, it is preferable that the side of the battery package 11 facing the circuit block 20, namely, the side where the connection terminal 16 is provided is hermetic, and has no small hole, in order to prevent the electrolytic solution from leaking through the small hole and intruding in the circuit block 20.

Similarly, though in the foregoing embodiment as described, both the battery chamber 42 and the circuit chamber 43 in the outer case 40 have the hermetic structure, the circuit chamber 43 can include a completely hermetic structure, and the battery chamber 42 has the above mentioned small hole.

Though the case of replacing the battery block 10 or the circuit block 20 with using the same outer case 30 has been described in the foregoing embodiment, in an embodiment, the battery block 10 or the circuit block 20 can be inserted in other outer case 30 whose shape is the same but whose material is different. For example, as to a digital camera, materials can be changed for the outer case 30 depending on whether specifications is for cold districts or warm-temperature regions. For example, the outer case 30 can be made of a heat insulation material to maintain heat generated by the batteries 14 for cold district specifications; while it is made of aluminum (Al) to raise heat release characteristics for warm-temperature region specifications. In an embodiment, the materials can be changed for the battery package 11 or the circuit package 21 depending on whether the specifications are for the cold districts or for the warm-temperature regions.

In addition, though the materials for the battery package 11 and the circuit package 21 are the materials made by injection molding the styrol resin in the foregoing first embodiment, other materials which are easily molded and processed, and whose insulation and weather resistance are good, such as ABS resin, polyethylene, and polyester can be used.

In an embodiment as described above, the case of replacement by removing the battery block 10 only or the circuit block 20 only from the battery pack has been described. However, a replacement can be made by removing both the battery block 10 and the circuit block 20 all at once. Such cases include, for example, a case of completely changing the measurement/protection circuit 24 in accordance with version upgrade of the battery 14. Since both the battery block 10 and the circuit block 20 are removable, the outer case 30 can be used as a dummy battery pack. Namely, for example, a user who uses the notebook computer only at his/her residence or office where AC power is supplied, can use the notebook computer which mounts only the outer case 30 in order to prevent dusts or the like from intruding inside. The user can purchase and use the battery block 10 and the circuit block 20 afterward as necessary.

Though the case of using, for example, the cylindrical lithium ion secondary batteries as the batteries 14 has been described in foregoing each embodiment, the shape of the batteries is not limited to the cylindrical shape, but a flat shape or a coin shape may be used. A lithium ion secondary battery wherein a wound electrode body using a gel electrolyte is enclosed by an exterior member made of a laminated film can be used. In such lithium ion secondary battery, it is not necessary to use the tab 15 provided separately from the battery 14, but connection with the connection terminal 16 as shown FIGS. 4, 5A and 5B can be obtained by using a tab itself derived from inside of the battery as the tab 15. Further, the present invention can be applied not only to the battery pack using the lithium ion secondary batteries, but can be also applied to battery packs using other secondary batteries such as nickel cadmium batteries and nickel hydrogen batteries, and further to battery packs using primary batteries.

Further, though the case of welding or soldering the joint surface of the tab 15 and the connection terminal 16 has been described in a foregoing embodiment, connection of the tab 15 and the connection terminal 16 can be firmly fixed without welding the tab 15 and the connection terminal 16 by setting the branched parts 15A and 15B of the tab 15 and the branched parts 16A and 16B of the connection terminal 16 so that they may engage with each other by frictional force. This allows easy removal of the batteries 14 when disposing the battery pack. The similar modification is available for the branched parts 48A and 48B of the tab 48 of the outer case 40 and the branched parts 15A and 15B of the tab 15 of the battery 14 in the second embodiment.

Though the case of providing only the partition wall 41 on the lower case 44 of the outer case 40 has been described in a foregoing embodiment, a component other than the partition wall 41, such as a boss or a raised ridge which supports the battery 14, can be provided inside of the lower case 44, so that the battery 14 can be easily set into the lower case 44 by inserting fingers in a clearance around the boss or the raised ridge.

Furthermore, though concrete examples of the polymeric materials, the electrolytic salts, and the solvents for the batteries 14 have been described in foregoing embodiments, other materials can be used.

As described above, according to an embodiment of the battery pack of the present invention, the outer case can fit in and house the battery block and the circuit block. Thus, the battery block and the circuit block can be tightly fit inside of the outer case, so as to form a nested structure, so that there is no shaky movement. Additionally, since the battery block and the circuit block can be independently desorbed from the outer case, when a defect of the battery block or the circuit block occurs in a manufacturing process, the block with the defect can be picked up and replaced on its own. Therefore, manufacturing yield ratio can be improved, and amount of waste can be decreased, resulting in obtaining a great advantage environmentally. Further, when the batteries of the battery block are deteriorated or consumed due to duration of life or the like, the battery block can be replaced on its own and continue to use the well-functioning circuit block. Therefore, needless waste can be avoided.

In addition, the batteries and the circuit are separately housed in the battery package and the circuit package respectively. Thus, even when the electrolytic solution leaks from the batteries, the leaked electrolytic solution remains in the battery package, and is hard to reach the circuit in the circuit package. Therefore, major accidents such as smoking and ignition due to migration are prevented, and the safety is improved. Further, the battery package and the circuit package block transmission of the heat generated by the batteries in the battery block during high load discharge to the circuit block. They also block transmission of the heat generated in the circuit in the circuit block to the battery block. Thus, deterioration or unbalance of the battery performance influenced by the heat can be prevented.

According to the battery pack of an embodiment of the present invention, since at least one of the battery package and the circuit package is a hermetic package, leakage and intrusion of the electrolytic solution can be further surely prevented.

According to an embodiment of the battery pack of the present invention, since inside of the outer case is completely separated into two chambers by the partition wall, and the batteries and the circuit are separately housed in the two chambers respectively, even in the case where the electrolytic solution leaks from the batteries, the leaked electrolytic solution remains inside of the chamber which houses the batteries, and is hard to reach the circuit. Thus, major accidents such as smoking and ignition due to migration is prevented, and the safety is improved. Besides, since the partition wall is provided in the outer case, falling strength of the outer case can be improved.

According to an embodiment of the battery pack of the present invention, since the partition wall is formed by press-fitting the lower partition wall into the groove of the upper partition wall, it can surely prevent the electrolytic solution from flowing through the clearance around the joint surface and reaching the circuit, unlike with the partition wall formed by ultrasonic joint or the fixed partition wall.

According to the battery pack of another embodiment of the present invention, since the tab of the outer case is provided by insert molding, leakage of the electrolytic solution through the clearance between the tab and the partition wall can be surely prevented.

According to the battery pack of still another embodiment of the present invention, since the tab of the outer case and the tab of the battery are connected by engaging their branched parts provided on each edge of each tab, joint strength can be improved.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A battery pack comprising:
a battery block that houses one or more cylindrical lithium ion secondary batteries in a battery package, said batteries being arranged in the battery block according to a given polarity and include an external connector and connected to each other with a metal tab, wherein the tab is made by punching out a metal plate material into a strip shape and bending the strip in a given shape;
a circuit block housing a circuit in a circuit package, the circuit having a measurement function associated with at least one of a use condition of the batteries, a measurement function associated with performance of the batteries, and a protection function to protect the batteries, wherein the circuit block housing includes a pressure release hole; and
an outer case capable of fitting in and housing the battery block and the circuit block, wherein the battery block and the circuit block can be independently removed and replaced from the outer case, and wherein an inside dimension of the outer case substantially equals a total outside dimension of the battery block and the circuit block, wherein the battery block has a connection terminal on a side facing the circuit block, said connection terminal connected to the tab, and the circuit block has a connection on a side facing the battery block and a part of the connection terminal which is exposed out of the battery package and circuit package includes a blade spring in a tranche shape, wherein at least one of the battery package and the circuit package includes a hermetic package, and wherein the hermetic package has a hermetic structure that is formed by fitting together an open top lower package and an upper package having a groove corresponding to an opening of the lower package by press fitting and the outer case can include a notch on a sidewall of the lower case and a notch on a sidewall of the upper case, wherein the upper case can releasably engage the lower case such that the external connector of the battery block is accessible through the notch.

2. The battery pack according to claim 1, wherein the connection terminals are insert molded in the battery package and the circuit package.

3. The battery pack according to claim 1, wherein the connection terminal and a tab of the battery have branched parts on each edge and are connected by engaging the branched parts of the connection terminal and the branched parts of the tab of the battery.

4. A battery pack comprising:
an outer case for housing one or more cylindrical lithium ion secondary batteries and a circuit having an external connector and at least one of a measurement function associated with a use condition of the batteries, a measurement function associated with performance of the batteries and a protection function to protect the batteries, wherein battery tabs at both ends are connected to a cathode and an anode of the battery and a central tab is connected to a midpoint lead, and
wherein the midpoint lead is adapted to measure a potential between two batteries, and wherein inside of the outer case is completely separated into two chambers by a partition wall and the batteries and the circuit are separately housed in the two chambers, respectively, and wherein the outer case comprises a pressure release hole and an open top lower case with an inside that is sectioned into a plurality of chambers by a lower partition wall; and an upper case having an upper partition wall with a groove corresponding to the lower partition wall such that the two chambers have hermetic structures by formation of the partition wall by press fitting the lower partition wall into the groove of the upper partition wall and by forming a joint at an opening of the lower case, wherein the external connector is accessible via a notch disposed in the outer case, and wherein the tabs are arranged on the lower partition wall by insert molding and the tabs are made by punching out a metal plate material into a strip shape and bending the strip in a given shape.

5. The battery pack according to claim 4, wherein a tab of the outer case and a tab of the battery have branched parts on each edge and are connected by engaging the branched parts of the tab of the outer case and the branched parts of the tab of the battery.

6. The battery pack according to claim 4, wherein the outer case comprises tabs installed through at least one of the lower partition wall and the upper partition wall for electrically connecting the batteries and the circuit.

7. A battery pack comprising:
a battery block, the battery block including:
a battery package configured to house at least two substantially cylindrical batteries;
at least one metal tab configured to electrically connect the at least two substantially cylindrical batteries; and
at least one battery connection terminal electrically connected to the at least one metal tab;
a circuit block, the circuit block including:
a pressure release hole;
a circuit package supporting a circuit programmed to perform a measurement function and programmed to perform a protection function;
at least one circuit connection terminal configured to electrically connect to the at least one battery connection terminal; and
an outer case, the outer case including:
a lower case having a sidewall defining an interior, the lower case sized to carry the electrically connected battery and circuit blocks within the interior;
an upper case having a sidewall defining an interior, the sidewall of the upper case sized to enclose and removable engage the sidewall of the lower case in a nested and hermetically sealed manner;
a notch formed by the cooperation of the sidewall of the lower case and the sidewall of the upper case.

8. The battery pack of claim 7, wherein the circuit block includes a vent hole configured to relieve pressure generated via thermal buildup.

9. The battery pack of claim 7, wherein the at least one connection terminals are insert molded in the battery package and the circuit package.

10. The battery pack of claim 7, wherein the at least one battery connection terminal and the at least one metal tab of the battery block each define a branched part, the branched part of the at least one battery connection terminal configured to engage the branched part of the at least one metal part.

11. A battery pack comprising:
a battery block, the battery block including:
a battery package configured to house at least two substantially cylindrical batteries;
at least one metal tab configured to electrically connect the at least two substantially cylindrical batteries; and
at least one battery connection terminal electrically connected to the at least one metal tab;
a circuit block, the circuit block including:
a pressure release hole;
a circuit package supporting a circuit programmed to perform a measurement function and programmed to perform a protection function;
at least one circuit connection terminal configured to electrically connect to the at least one battery connection terminal; and
an outer case, the outer case including:
a lower case having a sidewall defining an interior, the interior including a first chamber sized to carry the battery block, and a second chamber sized to carry the circuit block, wherein the battery and circuit blocks are electrically connected through a lower partition wall separating the first and second chambers;
an upper case having a groove, the upper case sized to cooperate with the lower case such that the groove engages the lower partition wall to provide a hermetic seal between the upper and lower cases;
a notch disposed in the outer case.

12. The battery pack of claim 11, wherein the circuit block includes an external connector accessible via the notch.

* * * * *